United States Patent Office 3,326,194
Patented June 20, 1967

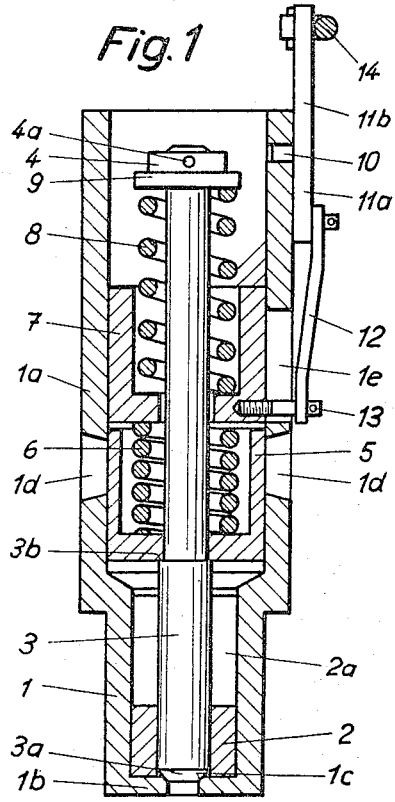
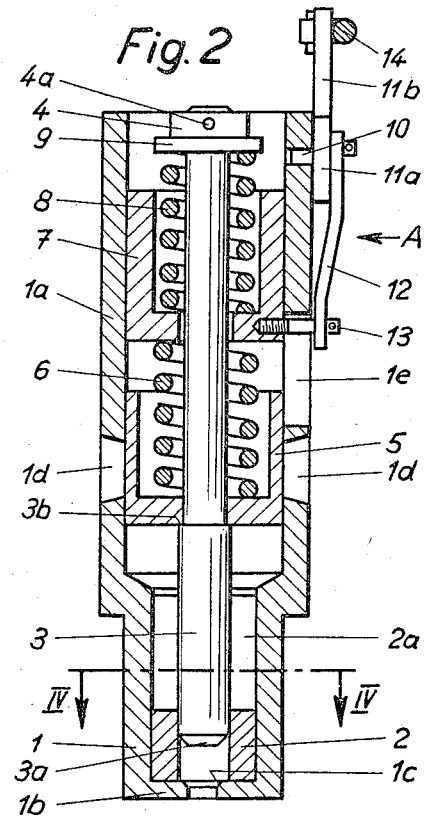
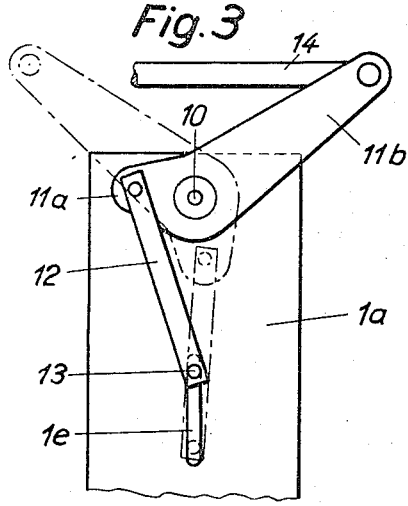
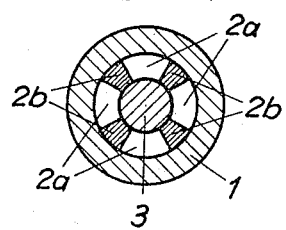

3,326,194
BRAKING DEVICE FOR INTERNAL COMBUSTION ENGINES
Richard Haller, Brauerstrasse 51, Zurich, Switzerland
Filed Aug. 19, 1965, Ser. No. 481,137
Claims priority, application Switzerland, Aug. 24, 1964, 11,133/64
6 Claims. (Cl. 123—97)

The present invention relates to an engine braking device for internal combustion engines, in self-propelled vehicles in particular.

Engine braking devices for internal combustion engines are already known, wherein each cylinder of the said engine is equipped with a braking valve, which is held closed constantly while the engine is performing work. Each braking valve of an engine braking device of this nature has a valve cone pressed on to a valve seat by spring action. When the engine braking device has been placed in the standby position ready to perform braking, i.e., after the fuel feed has been turned off and a running vehicle is to be braked by means of the vehicle engine, the pressure prevailing in the combustion space of the engine cylinder acts on this valve cone. When the highest compression pressure is reached in the cylinder, or shortly beforehand, the valve cone is lifted off its seat, so that the compressed air can escape from the cylinder. In order to prevent the immediate closing of the braking valve when the pressure in the combustion space of the cylinder drops below the level required to open the braking valve, and thus to prevent the still considerable pressure in the combustion space of the cylinder from exerting a driving action on the piston beyond top dead center, it has already been suggested that the valve cone be connected to a piston or the like, which is guided in a cylindrical bore of the valve case, which has a working area which is a multiple of that of the valve cone and which controls discharge orifices formed in the sides of the valve case. In an arrangement of this kind, the air which escapes when the valve cone is forced off its seat by the pressure of the air compressed in the cylinder, acts initially on the working surface of the said piston and repels the latter until it uncovers the discharge orifices and the compressed air can escape to the surrounding atmosphere. Since the compressed air now acts on the considerably greater working surface of the piston, the brake valve is held open until the pressure in the cylinder has dropped to a value which is a fraction only of the pressure which acts first on the valve cone in order to open the valve. The pressure in the combustion space of the cylinder thus drops almost to atmospheric pressure, so that a driving action can no longer be exerted on the piston of the engine after it has passed beyond top dead center. The work of compression is thus utilized to brake the vehicle. Such engine braking devices, which may be employed for all kinds of piston engines, and specifically for two-stroke engines, have proved to be satisfactory in principle. However they have the serious disadvantage that the valve cone of each braking valve strikes violently against its seat after each pressure release, so that both the valve cone and the valve seat are subject to relatively extensive wear. It is an object of the present invention to eliminate this disadvantage.

The invention relates to an engine braking device for internal combustion engines, in self-propelled vehicles in particular, wherein each cylinder of the internal combustion engine is equipped with a braking valve adapted to be held closed constantly while the engine is performing work. Each braking valve has a valve cone pressed by spring action against a valve seat, and the pressure prevailing in the combustion space of the cylinder acts on the valve cone. A piston is coupled to this valve cone and is guided in a cylindrical bore of the valve case, such piston having a working area which is a multiple of that of the cone. The piston controls discharge orifices in the sides of the valve case, and is acted upon by the pressure of the charge escaping from the cylinder between the valve cone and its seat during braking action. The engine braking device according to the invention is characterised by situating above the valve seat, a valve element in the form of a sleeve or bushing, whose upper portion is of castellated or otherwise slotted. A valve stem equipped with a cone or taper at one end thereof which fits into the valve seat, passes tightly through a valve element and through a piston which is mounted in the cylindrical bore of the upper part of the valve case. The piston controls the discharge orifices, has a working surface which is a multiple of that of the cone of the valve stem, and is acted upon by a compression spring to urge the valve stem towards the valve seat. Means are provided to place the piston and thus the valve stem in a standby position prior to braking action, in which position the cone of the valve stem is lifted off the valve seat, but the valve stem still closes the valve element off hermetically.

In the case of this engine braking device, appreciable wear cannot occur to either the valve cone or the valve seat, because when the engine braking device is ready for operation, i.e., when its braking valves are in the standby position, the cone of the valve stem is lifted off the valve seat and can never strike the latter when the braking valve is in operation. This arrangement also generates less noise than previous forms of engine braking devices.

A preferred form of example of the invention is to be described hereinafter, by way of example but by no manner of means of limitation, with reference to the accompanying drawings, wherein:

FIGURE 1 is an axial section taken through a braking valve of an engine braking device for internal combustion engines, in the inoperative condition, FIGURE 2 is a corresponding section taken through this braking valve, in the operative condition, FIGURE 3 is a fragmentary side elevational view of the upper part of this braking valve, and FIGURE 4 is a section taken along the line IV—IV of FIGURE 2.

The braking valve illustrated has a valve case whose lower portion 1 is of small diameter and is firmly set into the cylinder head of an internal combustion engine, and whose upper part 1a has a greater diameter. The lower or interiorly directed part of this valve case has an inwardly directed flange 1b which forms the valve seat 1c. On the flange 1b of the lower part 1 of the valve case there is situated a valve element 2 in the form of a bushing or sleeve, whereof the upper portion is divided into lugs 2b or the like by axially extending slots 2a which extend as far as its upper extremity. In the bore of the valve element 2 there is fitted a valve stem 3, whose lower extremity has a cone or taper 3a fitting in the valve seat 1c, and whose upper extremity is situated in the upper part 1a of the valve case and is endowed with a screw-thread, having screwed thereon, a nut 4 which is secured by means of a set screw 4a. The valve stem 3 has a shoulder 3b on which bears the base of a pot-shaped or cup-shaped piston 5 guided in the upper part 1a of the valve case, this piston base having a bore traversed by the valve stem 3. The pot-shaped piston 5 has mounted therein a helical compression spring 6, whose upper extremity bears on the base of a second pot-shaped piston 7 guided in the part 1a of the valve case, this piston base having an oversize aperture through which the valve stem 3 freely passes. In this piston 7 there is mounted a helical compression spring 8 whose upper extremity acts on a washer 9 bearing on the nut 4. In the sides of the upper part 1a of the valve case discharge orifices 1d are provided in spaced distribution and these orifices are completely covered and by the piston 5 when the latter is in the bottom position. Close to the upper extremity of the part 1a of the valve case there is secured a pivot pin 10 on which is mounted a double-armed lever 11, a thrust or link rod 12 being articulated to the short arm 11a of this lever. The other extremity of this link rod 12 is mounted on a screw bolt 13 which is screwed into the piston 7 through an axially extending slot 1e in the side of the part 1a of the valve case. The longer arm 11b of the double-armed lever 11 has articulated to it a rod 14 which forms a part of a linkage system actuating the braking valves of all cylinders of the internal combustion engine, which linkage may be operated from the driver's seat and is not illustrated.

When the engine is not being used to brake the vehicle, the braking valves of all cylinders are so set by means of the linkage operated from the driver's seat, as to assume the position shown in FIGURE 1. The piston 7 of the braking valves is then pressed downwards by means of the rod 14, the lever 11 and the linking rod 12, towards the valve seat 1c, so that the compression spring 6 compressed thereby also presses the piston 5 and thus the valve stem 3 downwards, causing the cone 3a to bear firmly against the valve seat 1c. The compression spring 6 is then compressed so powerfully that its force is sufficient to hold the cone 3a pressed against the valve seat 1c even at the highest pressure reached in the combustion space of the cylinder. The linkage comprising the rod 14 is appropriately locked in adequate manner in this position. When the internal combustion engine is to be used for braking the running vehicle, and after shutting off the fuel feed, actuation of the said linkage system acts through the rods 14 and causes the braking valves of all cylinders of the internal combustion engine to assume the position illustrated in FIGURE 2. The piston 7 is then displaced upwards, thereby reducing the initial loading of the compression spring 6, so that the force of the compression spring 8 acting against the washer 9 causes the valve stem 3 and thus the piston 5 to be pulled upwards slightly. Equilibrium now prevails between the more powerfully compressed compression spring 8 and the partially relieved compression spring 6. The valve stem 3 and the piston 5 pressed against its shoulder 3b are then held in a position in which the piston 5 still covers the discharge orifices completely, the cone 3a of the valve spindle being raised clear of the valve seat 1c, but the lower extremity of the valve stem 3 still fitting hermetically in the uninterrupted lower portion of the valve element 2. The force of the compression spring 6 is then so reduced as to be unable to hold the piston 5 and thus the valve stem 3 when the pressure prevailing in the combustion space of the cylinder reaches a certain level. Shortly before, or when the pressure in the cylinder of the engine entrained by the running vehicle has reached its greatest value, the valve stem 3 is pressed back further and its lower extremity reaches the region of the slots 2a of the valve element 2, so that the compressed air can issue upwards from the combustion space on the cylinder, through the valve seat 1c, the bore of the valve element 2 and its slots 2a, and can act with full force on the base of the piston 5. The piston 5 is thereby rapidly pressed further upwards, until it uncovers the discharge orifices 1d in the side of the part 1a of the valve case, so that the compressed air can escape into the surrounding atmosphere, the pressure acting on the base of the piston 5 then diminishing rapidly. Since the working surface of the piston 5 is a multiple of that of the cone 3a, the piston is held in the upper position until the escaping air has a pressure amounting to a fraction of that needed to open the valve and acting only on the cross-sectional area of the valve stem 3. The discharge orifices 1d are thus covered again by the piston 5 when the pressure in the combustion space of the cylinder has dropped almost to atmospheric pressure. Any residual pressure also disappears as soon as the piston of the internal combustion engine has passed beyond its top dead center and travels downwards again. The valve stem 3 and the piston then return to the position shown in FIGURE 2. This action is repeated for each compression stroke of the pistons of the internal combustion engine, and the valve stem 3 and the piston 5 are moved up and down in the rhythm of these compression strokes. During this pulsation of the valve stem 3 with the piston 5, the cone 3a of the valve stem 3 never descends lower than the position shown in FIGURE 2 and thus it never touches its seat 1c, so that wear of these parts is impossible. The valve spindle or stem 3 is guided even in the raised position, between the lugs 2b of the valve element 2.

The braking action of the braking valve may be influenced and set to the desired value by adjusting the position of the piston 7 in the part 1a of the valve case in the standby position illustrated in FIGURE 2.

The invention is evidently not limited to the form of embodiment hereinbefore described and illustrated solely by way of example, and modifications of details and/or technically equivalent devices may be incorporated without thereby exceeding the scope of the present invention.

I claim:

1. In an internal combustion engine having at least one cylinder and piston means forming a combustion chamber and a braking device coupled therewith, the improvement in said braking device comprising:

casing means communicating with said combustion chamber;

valve means disposed within said casing means to control flow of gases from said combustion chamber;

said valve means including a valve member axially movable in said casing means, a valve seat against which one end of said valve member can abut, and a valve sleeve having a central bore through which said valve member projects;

said valve sleeve including a first portion adjacent said valve seat and a second portion spaced further away therefrom;

said valve member fitting closely and substantially hermetically within said central bore, at least at said first portion of said valve sleeve, to prevent gases from said combustion chamber from passing through said central bore;

a piston member disposed within said casing means adjacent said valve sleeve second portion, said piston member being coupled with said valve member for concurrent axial movement therewith;

said valve sleeve second portion having at least one opening means therein communicating between said central bore and said piston member;

said casing means including gas discharge port means normally covered by said piston member;

control means operatively connected with said valve member to render said braking device inoperative by locking said valve member against axial movement with said one end thereof firmly seated against said valve seat;

said control means also being operative to render said braking device operative by releasing said valve member for axial movement within said casing means; and, biasing means exerting a biasing force on said valve member to urge said one end thereof toward said valve seat;

said biasing means being operative, when said control means renders said braking device operative, to move said valve member to a first position whereat said one end thereof is disposed within said first portion of said valve sleeve in spaced relation from said valve seat;

said valve member also being movable to a second position when the pressure of the gases from said combustion chamber exceeds the biasing force of said biasing means;

said valve member second position disposing said one end thereof in said second portion of said valve sleeve and disposing said piston member in a position which uncovers said discharge port means whereby said gases from said combustion chamber pass through said opening means and exhaust through said discharge port means;

said valve member being movable back to said first position when said biasing force exceeds said combustion gas pressure;

said valve member thus being axially movable between said first and second positions in response to operation of said internal combustion engine and generation of said combustion chamber gas pressure to operate as an engine brake device, but said valve member one end always being maintained out of contact with said valve seat as said axial movement occurs, thereby preventing undue wear and undue noise.

2. The improvement defined in claim 1 wherein said opening means in said valve sleeve second portion includes a plurality of axially extending spaced slots.

3. The improvement defined in claim 1 wherein the active surface area of said piston member exceeds that of said valve member one end whereby the combustion gas pressure force needed to move said valve member from said first position exceeds that needed to maintain said valve member in said second position.

4. The improvement defined in claim 1 wherein said control means includes:

an auxiliary piston member juxtaposed to said piston member and having first and second opposed faces;

said auxiliary piston member including a hole through said first and second faces with said valve member passing freely through said hole;

said biasing means including a first compression spring reacting between said piston member and said first face;

said biasing means also including a second compression spring reacting between said second face and attachment means at the end of said valve member opposed to said one end thereof;

and operating means coupled with said auxiliary piston member to control the position thereof.

5. The improvement defined in claim 4 further including an elongated slot means in said casing means, with said operating means including an element projecting through said slot means and attached to said auxiliary piston member.

6. The improvement defined in claim 5 wherein said operating means further includes a pivotally mounted double arm crank member, a link coupled between one arm of said crank member and said element, and a movable rod coupled with the other arm of said crank member to control pivotal movement of said crank member.

References Cited

UNITED STATES PATENTS

| | | | |
|---|---|---|---|
| 2,968,295 | 1/1961 | Haller | 123—97 |
| 3,254,743 | 7/1966 | Finger | 123—97 |

MARK NEWMAN, *Primary Examiner.*

RALPH D. BLAKESLEE, *Examiner.*